United States Patent [19]
Carr

[11] 3,852,455
[45] Dec. 3, 1974

[54] 4-[4(α-HYDROXYBENZYL)PIPERIDINO]-4'-FLUOROBUTYROPHENONE DERIVATIVES AS TRANQUILIZERS

[75] Inventor: Albert A. Carr, Cincinnati, Ohio

[73] Assignee: Richardson-Merrell Inc., New York, N.Y.

[22] Filed: May 3, 1972

[21] Appl. No.: 249,886

Related U.S. Application Data
[63] Continuation of Ser. No. 93,495, Nov. 27, 1970, abandoned.

[52] U.S. Cl............ 424/267, 260/293.73, 260/293.8
[51] Int. Cl............................................ A61u 27/00
[58] Field of Search ..... 424/267; 260/293.8, 293.73

[56] References Cited
UNITED STATES PATENTS
3,438,991    4/1969    Janssen.......................... 260/293.8

OTHER PUBLICATIONS
Chem. Abst., 70, 68126, (April 1969) Lunsford et al.

Primary Examiner—Stanley J. Friedman
Attorney, Agent, or Firm—L. Ruth Hattan; Eugene O. Retter; George W. Rauchfuss, Jr.

[57] ABSTRACT

Novel compounds which are neuroleptic agents useful as tranquilizers and having the formula

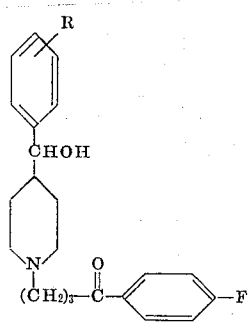

wherein R is hydrogen, halogen, such as chlorine, bromine or fluorine, alkyl having from 1 to 4 carbon atoms, alkoxy having from 1 to 4 carbon atoms, thioalkoxy having from 1 to 3 carbon atoms, trifluoromethyl, phenyl or phenoxy and may be attached to the phenyl ring in the ortho, meta or para position or pharmaceutically acceptable acid addition salts thereof. The novel compounds are produced by reacting (substituted) α-phenyl-4-piperidinemethanols or salts thereof with 4'-fluoro-4-halobutyrophenones.

7 Claims, No Drawings

4-4(α-HYDROXYBENZYL)PIPERIDINO)-4-FLUOROBUTYROPHENONE DERIVATIVES AS TRANQUILIZERS

RELATIONSHIP TO OTHER APPLICATIONS

This application is a continuation of application Ser. No. 93,495, filed Nov. 27, 1970 and now abandoned.

FIELD OF INVENTION

This invention relates to novel derivatives of α-phenyl-4-piperidinemethanols and to processes for preparing the same. More particularly, it relates to novel derivatives of 4-[4-(α-hydroxybenzyl)piperidino]-4'-fluorobutyrophenones which are neuroleptic agents useful as tranquilizers and to processes for preparing the same.

SUMMARY OF THE INVENTION

The novel derivatives of α-phenyl-4-piperidinemethanols of this invention may be represented by the formula

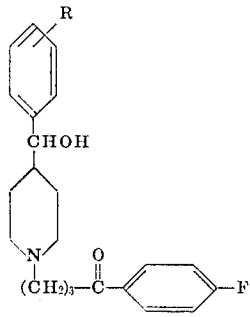

Formula I wherein R is hydrogen, halogen, such as chlorine, bromine or fluorine, alkyl having from 1 to 4 carbon atoms, alkoxy having from 1 to 4 carbon atoms, thioalkoxy having from 1 to 3 carbon atoms, trifluoromethyl, phenyl or phenoxy and may be attached to the phenyl ring in the ortho, meta or para position or pharmaceutically acceptable acid addition salts thereof. The novel compounds are produced by reacting (substituted) α-phenyl-4-piperidinemethanols or salts thereof with 4'-fluoro-4-halobutyrophenones.

DETAILED DESCRIPTION OF INVENTION

As examples of the substituents which R may represent in the above formula, there may be mentioned, for example, a hydrogen atom, methyl, iso-propyl, t-butyl, methoxy, ethoxy, $CF_3$, phenyl, phenoxy, methylmercapto, or a halogen atom such as fluorine, chlorine, or bromine. The R substituent may be in the ortho, meta or para position on the phenyl radical.

The preferred compounds of this invention are those of the above formula wherein R is fluorine, chlorine or a trifluoromethyl radical substituted in the meta or para position on the benzyl moiety. The preferred compounds are represented by the general formula

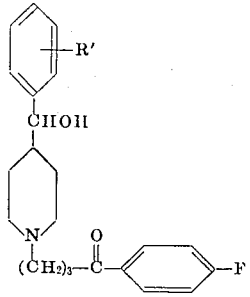

Formula II wherein R' is fluorine, chlorine or trifluoromethyl and the R' substituent is attached to the phenyl ring in the meta or para position.

The invention also includes the pharmaceutically acceptable acid addition salts of the compound of the hereinbefore set forth formulae, optical isomers and salts thereof, such as those salts with inorganic acids, such as, for example, hydrochloric, hydrobromic, sulphuric, phosphoric acids and the like and with organic carboxylic acids such as, for example, acetic, propionic, glycolic, lactic, pyruvic, malonic, succinic, fumaric, malic, tartaric, citric, ascorbic, maleic, hydroxymaleic, and dihydroxymaleic, benzoic, phenylacetic, 4-aminobenzoic, 4-hydroxybenzoic, anthranilic, cinnamic, salicylic, 4-aminosalicylic, 2-phenoxybenzoic, 2-acetoxybenzoic, mandelic acid and the like.

Illustrative of compounds of this invention are, for example, 4'-fluoro-4-[4-(p-fluoro-α-hydroxybenzyl)-piperidino]-butyrophenone, 4-[4-(p-chloro-α-hydroxybenzyl)piperidino]4'-fluorobutyrophenone, 4'-fluoro-4-[4-(m-trifluoromethyl-α-hydroxybenzyl)-piperidino]butyrophenone, 4'-fluoro-4-[4-(α-hydroxybenzyl)piperidino]butyrophenone, 4'-fluoro-4-[4-(p-methyl-α-hydroxybenzyl)piperidino]-butyrophenone, 4'-fluoro-[4-(p-methoxy-α-hydroxybenzyl)piperidino]-butyrophenone, 4-[4-(p-t-butyl-α-hydroxybenzyl)-piperidino]-4'-fluorobutyrophenone, 4'-fluoro-4-[4-(p-phenoxy-α-hydroxybenzyl)piperidino]-butyrophenone, and 4'-fluoro-4-[4-(p-phenyl-α-hydroxybenzyl)-piperidino]butyrophenone.

The novel compounds of this invention are neuroleptic agents useful as tranquilizers in animals in the form of pharmaceutical preparations which contain the novel compounds suitable for oral or parenteral administration. The pharmaceutical preparations can be in solid or liquid form such as, for example, tablets, capsules, solutions, suspensions or emulsions. The quantity of the novel compound, in the unitdosage with a significant amount of a pharmaceutically acceptable carrier, can vary over a wide range, for example, to provide from about 0.005 to 10 mg per kg of body weight of the animal per dose to achieve the desired tranquilizing effect. The tranquilizing effect can be obtained, for example, by consumption of 0.5–25 milligram tablets taken 1 to 4 times daily.

Illustratively, when the compound of Example 1 was orally administered to mice at a dosage level of 0.35 mg/kg, the toxicity of d-amphetamine in grouped mice was inhibited in 50% of the mice when tested according to the procedures disclosed by J. Burn et al., *Arch. Int. Pharmacodyn.* 113, 290–5 (1958), whereas a dosage level of 1.2 mg/kg of the known tranquilizer chlorpromazine is required to inhibit the toxicity of d-amphetamine in 50% of similarly grouped mice. Similarly, when the compound of Example 1 was orally administered to mice at a dosage level of 1.2 mg/kg pernicious preening in mice was inhibited in 50% of the mice when tested according to the test procedures disclosed by A. Kandel et al., *Fed. Proc.* 19 (1 Pt. 1) 24 (1960).

The neuroleptic potency of the novel compounds of this invention is also illustrated by their effectiveness in blocking conditioned avoidance behavior in rats and in producing catalepsy in mice. Interference with the forced motor performance on a rotating rod is evidenced when the compounds of this invention are administered to mice.

The compounds of this invention are prepared by reacting (substituted) α-phenyl-4-piperidinemethanols or salts thereof with a small excess of 4'-fluoro-4-halobutyrophenone in the presence of an excess of an acid acceptor such as, for example, sodium bicarbonate, potassium bicarbonate, sodium carbonate or potassium carbonate optionally with a small amount of potassium iodide in a suitable solvent. The mixture is reacted over a wide range of temperatures from about 80° to about 180°C., although it is possible to employ temperatures above and below this range. Generally, the reaction is conducted over a period of from 1 to 3 days during which time any evolved water may be collected. As examples of suitable solvents for this reaction there may be mentioned toluene, xylene, chlorobenzene, methyl isobutyl ketone, or lower alcohols such as ethanol, propanol, butanol and the like.

After completion of the reaction, the reaction mixture is filtered and the product isolated after removal of the solvent. Alternately, the filtrate may be treated with mineral or organic acids and diethyl ether to give the corresponding salts of the product. The crude product is filtered off, purified by recrystallization and dried. Suitable solvents for recrystallization are methanol, ethanol, isopropyl alcohol, butanone, acetone, ethyl acetate, diethyl ether and the like.

The general method for the preparation of the compounds of this invention can be represented by the following reaction scheme:

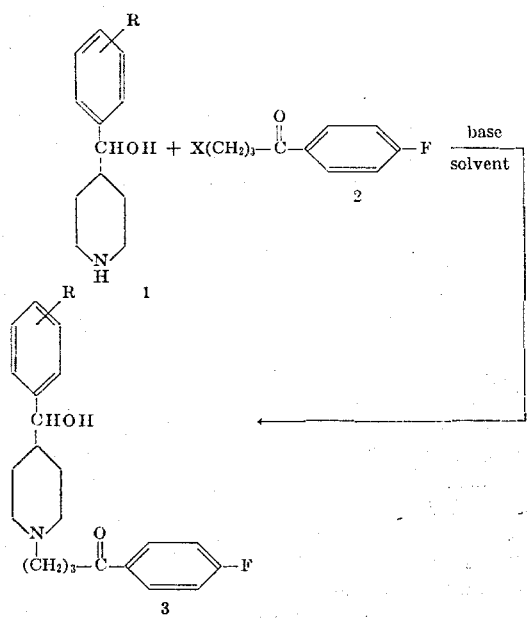

wherein R is as defined hereinbefore and X is reactive halogen such as bromine, chlorine or iodine.

The α-phenyl-4-piperidinemethanol derivatives, compounds 1, may be prepared by reduction of the corresponding ketone derivative. This reduction can be effected by several methods, preferably by catalytic hydrogenation, or metal hydride reduction. Compound 1 may also be prepared by reacting a substituted phenyl Grignard reagent with 4-pyridine carboxaldehyde or 4-cyanopyridine followed by catalytic reduction of the intermediates thus obtained. The α-phenyl-4-piperidinemethanol derivative may be isolated as the free base or as a salt, for example, the hydrochloride. Representative substituted α-phenyl-4-piperidinemethanol starting materials which find use in preparing the compounds of this invention are contained in Table I, hereinafter.

TABLE I

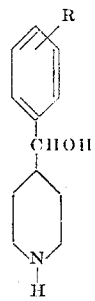

| R | M.P., °C. | R | M.P., °C. |
|---|---|---|---|
| p-F | *259-261 | p-OCH₃ | 127-128.5 |
| p-Cl | *273.5-274 | p t-C₄H₉ | 159.5-161 |
| H | 166-167 | p-OC₆H₅ | 172.5-175 |
| p-CH₃ | 142-143.5 | m-CF₃ | °181.5-183.5 |

*Hydrochloride salt.

The intermediate substituted phenyl 4-piperidyl ketones used in preparing compound 1 may be prepared by a Friedel-Craft reaction of benzene or a substituted benzene with isonipecotic acid chloride hydrochloride or N-(trifluoroacetyl)-isonipecotic trifluoroacetic anhydride followed by aqueous potassium carbonate hydrolysis in the latter case. Reaction of a substituted phenyl Grignard reagent with 4-cyanopiperidine, which can be prepared by hydrolyzing N-trifluoroacetyl-4-cyanopiperidine with aqueous potassium carbonate, will also yield the intermediate ketones.

The 4'-fluoro-4-halobutyrophenone, compound 2, is commercially available or may be prepared by reacting ω-halobutyryl halide with fluorobenzene in the presence of aluminum chloride. Also, compound 2 may be prepared by reacting p-fluorophenyl magnesium halide with ω-halobutyronitriles.

Alternately the compounds of this invention may be prepared by treating ketalized derivatives of 4'-fluoro-4-[4-(substituted-α-hydroxybenzyl(piperidino]-butyrophenones with a dilute acid solution such as hydrochloric acid, sulfuric acid, p-toluenesulfonic acid, and the like, at room temperature for 3 to 12 hours. The ketal intermediate may be prepared by the reaction of the appropriately ketalized 4'-fluoro-4-halobutyrophenone with the appropriate 4-benzoylpiperidine in a solvent such as toluene, butanol, isopropyl alcohol, and the like, with or without potassium iodide, and a base such as potassium carbonate, sodium carbonate, potassium bicarbonate, or sodium bicarbonate, and subsequently reducing the product by catalytic hydrogenation or metal hydride reduction.

The butyrophenone alkylating agent may be ketalized using ethylene glycol, 1,3-propanediol, 2-methyl-2-ethyldioxolane, methanol and the like in a suitable solvent containing a small amount of hydrochloric acid, sulfuric acid or p-toluenesulfonic acid.

EXAMPLES

The following examples are illustrative of the invention.

EXAMPLE 1

4'-fluoro-4-[4-(p-fluoro-α-hydroxybenzyl)piperidino]-butyrophenone

To α-(p-fluorophenyl)-4-piperidinemethanol obtained from 26.0 g (0.11 mole) of the corresponding hydrochloride salt in 100 ml of toluene were added 40 g of potassium bicarbonate, 23.0 g (0.12 mole) of 4-chloro-4'-fluorobutyrophenone and 0.1 g of potassium iodide. The resulting mixture was stirred on a steam bath for 48 hours and the inorganic residue filtered off and washed with a small amount of butanone. The filtrate was diluted with anhydrous diethyl ether and treated with etheral hydrogen chloride to give the hydrochloride salt of 4'-fluoro-4-[4-(p-fluoro-α-hydroxybenzyl)piperidino]butyrophenone. This material was recrystallized from methanolbutanone and then extracted as the free base into chloroform after treatment with 10% sodium hydroxide solution. The chloroform extracts were dried over anhydrous magnesium sulfate and concentrated to a residue which was recrystallized from absolute ethyl alcohol to give 4'-fluoro-4-[4-(p-fluoro-α-hydroxybenzyl)piperidino]butyrophenone, M.P. 148°–150°C.

EXAMPLE 2

By the procedure described in Example 1 and using the appropriately substituted α-phenyl-4-piperidinemethanol, the following compounds were prepared:

4-[4(p-chloro-α-hydroxybenzyl)piperidino]-4'-fluoro-butyrophenone. M.P. 148°–150°C.

4'-fluoro-4-[4-(m-trifluoromethyl-α-hydroxybenzyl-(piperidino]-butyrophenone. M.P. 128.5°–132.0°C. (mandelic acid salt).

EXAMPLE 3

4'-fluoro-4-[4-(α-hydroxybenzyl)piperidino]-butyrophenone

To 75.7 g (0.4 mole) of α-phenyl-4-piperidinemethanol in 500 ml of toluene was added 88.0 g (0.44 mole) of 4-chloro-4'-fluorobutyrophenone, 80.0 g of potassium bicarbonate and 0.1 g of potassium iodide. The reaction mixture was stirred at 100°C. for 46 hours, filtered and the resulting solution concentrated in vacuo to a solid residue, which was recrystallized from isopropyl alcohol to give the desired product. M.P. 102°C. (dec.)

EXAMPLE 4

By the procedure described in Example 3 and using the appropriately substituted α-phenyl-4-piperidinemethanol, the following compounds were prepared:

4'-fluoro-4-[(p-methyl-α-hydroxybenzyl)piperidino]-butyrophenone. M.P. 144.5°–145.5°C.

4'-fluoro-4-[4-(p-methoxy-α-hydroxybenzyl)-piperidino]butyrophenone. M.P. 101°–102.5°C.

4-[4-(p-t-butyl-α-hydroxybenzyl)piperidino]-4'-fluorobutyrophenone. M.P. 111°–112..5°C.

4'-fluoro-4-[4-(p-phenoxy-α-hydroxybenzyl)-piperidino]butyrophenone. M.P. 195.5°–196.5°C.

EXAMPLE 5

4'-fluoro-4-[4-(p-phenyl-α-hydroxybenzyl)-piperidino]butyrophenone

A. By reacting p-biphenylyl 4-piperidyl ketone with 2-(3-chloropropyl)-2-(p-fluorophenyl)dioxolane in butanol in the presence of potassium carbonate and potassium iodide for 48 hours at 100°C. p-biphenylyl 4- {3-[2-(p-fluorophenyl) dioxolan-2-yl]propyl}piperidyl ketone is obtained.

B. The product of Part (A) in ethanol is reduced using excess sodium borohydride to give α-(4-biphenylyl)-1-{3-[2-p-fluorophenyl)dioxolan-2-yl]propyl-4-piperidinemethanol} which is treated with 1.0N HCl and stirred at room temperature for 4 hours. The reaction mixture is made alkaline and extracted into chloroform, dried over anhydrous magnesium sulfate, filtered and concentrated in vacuo to give the desired product.

EXAMPLE 6

4-[4-(p-ethylmercapto-α-hydroxybenzyl)piperidino]-4'-fluorobutyrophenone

To 25.1 g (0.1 mole) of α-(p-ethylmercaptophenyl)-4-piperidinemethanol in 200 ml of toluene is added 22.0 g (0.11 mole) of 4-chloro-4'-fluorobutyrophenone, 20.0 g of potassium bicarbonate and 0.1 g of potassium iodide. The reaction mixture is stirred at 100° C. for 32 hours, filtered and the resulting solution concentrated in vacuo to a solid residue which may be recrystallized from ethanol to give the desired product.

EXAMPLE 7

Tablet Formulation

As exemplary of a representative tablet formulation of an active compound of this invention, there may be mentioned the following:

|  | Per Tablet |
|---|---|
| (a) 4'-fluoro-4-[4-(p-fluoro-α-hydroxybenzyl)piperidino]butyrophenone | 25.0 mg. |
| (b) Wheat starch | 3.5 mg. |
| (c) Lactose | 10.0 mg. |
| (d) Magnesium stearate | 0.5 mg. |

A granulation obtained upon mixing lactose with the starch and granulated starch paste is dried, screened and mixed with the active ingredient and magnesium stearate. The mixture is compressed into tablets weighing 39.0 mg. each.

I claim:

1. A method of obtaining tranquilizing effects in a patient comprising administering to said patient from 0.005 to 10 milligrams per kilogram of body weight of the patient a compound of the formula

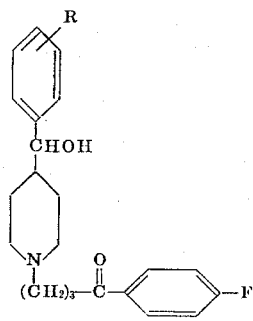

wherein R is a member selected from the group consisting of chlorine, fluorine, bromine, alkyl having from 1 to 4 carbon atoms, or alkoxy having from 1 to 4 carbon atoms and is attached at the para position of the phenyl ring; or a pharmaceutically acceptable acid addition salt thereof.

2. A method as claimed in claim 1 wherein said compound is 4'-fluoro-4-[4-(p-fluoro-α-hydroxybenzyl)-piperidino]butyrophenone or a pharmaceutically acceptable acid addition salt thereof.

3. A method as claimed in claim 1 wherein said compound is 4-[4-(p-chloro-α-hydroxybenzyl)piperidino]-4'-fluorobutyrophenone or a pharmaceutically acceptable acid addition salt thereof.

4. A method as claimed in claim 1 wherein said compound is 4'-fluoro-4-[4-(p-methyl-α-hydroxybenzyl)-piperidino]butyrophenone or a pharmaceutically acceptable acid addition salt thereof.

5. A method as claimed in claim 1 wherein said compound is 4'-fluoro-4-[4-(p-methoxy-α-hydroxybenzyl)-piperidino]butyrophenone or a pharmaceutically acceptable acid addition salt thereof.

6. A method as claimed in claim 1 wherein said compound is administered in dosage units containing 0.5 to 25 milligrams of said compound in tablets which are taken 1 to 4 times daily.

7. A pharmaceutical composition comprising in unit dosage form, from about 0.5 to 25 milligrams of a compound of the formula

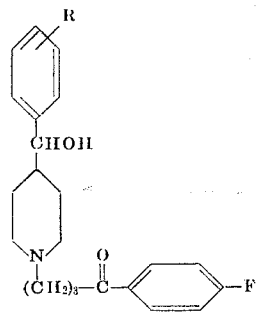

wherein R is a member selected from the group consisting of chlorine, fluorine, bromine, alkyl having from 1 to 4 carbon atoms, or alkoxy having from 1 to 4 carbon atoms and is attached at the para position of the phenyl ring; or a pharmaceutically acceptable acid addition salt thereof, and a significant amount of a pharmaceutically acceptable carrier.

* * * * *